Oct. 31, 1944. F. W. BERRY 2,361,814
DEVICE FOR LOCKING NUT OR LIKE THREADED MEMBERS ON BOLT SHANKS
Filed Dec. 1, 1942
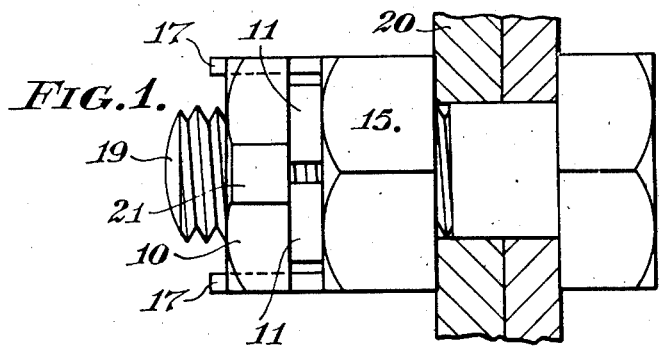
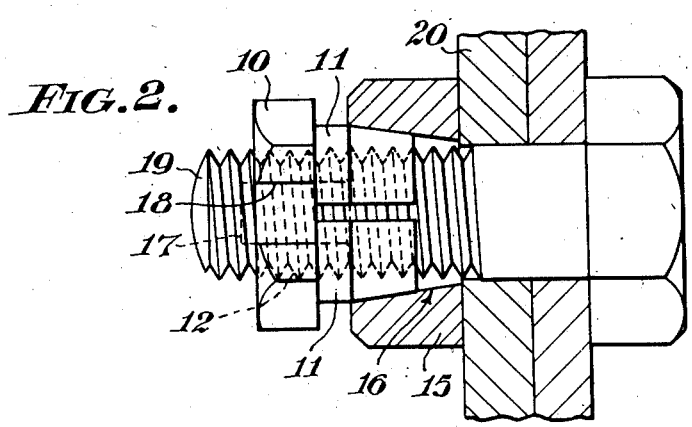
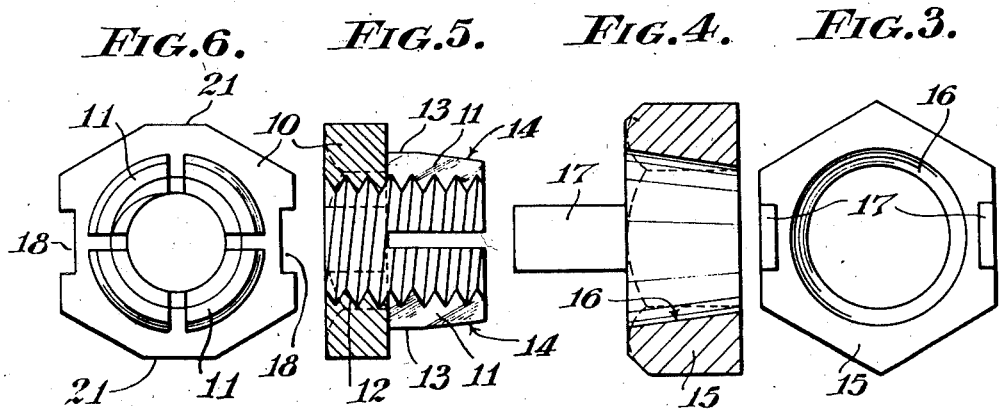
INVENTOR
FREDERICK W. BERRY
By Wachung Bert Groff Attys Patented Oct. 31, 1944

2,361,814

UNITED STATES PATENT OFFICE 2,361,814

DEVICE FOR LOCKING NUTS OR LIKE THREADED MEMBERS ON BOLT SHANKS

Frederick William Berry, Woodford Green, England

Application December 1, 1942, Serial No. 467,525
In Great Britain December 24, 1941

2 Claims. (Cl. 151—19)

This invention concerns improvements in or relating to devices for locking a nut or like threaded member such as a sleeve onto a bolt shank. The invention is especially intended for use as a lock nut device in aeroplane and engine construction and in all mechanisms and constructions which are subjected to vibration and load or to movement at high speed. The primary object of this invention is to provide a device which is simple to fit and remove and which ensures a positive lock by providing a plurality of locking elements, which do not however, weaken or strain the bolt shank nor impose lateral stress upon the threads. A further object is to provide a device which can be utilised for a multiplicity of purposes, and one having visible means for indicating that the device is properly set in locked condition. Other objects will be apparent from the following specification.

The term "nut" which is used in the following specification and claims is to be understood as including not only a nut proper but any other device which is adapted to be screwed onto a bolt shank or the like and which is to be locked thereto.

According to the invention a nut incorporates locking means comprising a split sleeve forming a unitary part of said nut and which is internally threaded, and there is provided an internally tapered member adapted to slide upon the said sleeve and, by reason of its taper form, to contract same so that said sleeve firmly binds on to a bolt shank or the like on to which the nut is screwed.

Preferably the sleeve is externally tapered substantially in correspondence with the taper of the internally tapered member, and preferably also means is provided for preventing relative rotation of the nut and the internally tapered member. Such means may comprise tongues, or the like extending from the internally tapered member and recesses formed in the nut, said tongues fitting into said recesses and being dimensioned to extend beyond the nut when the parts are locked together so as to provide projections capable of being struck to forcibly separate the nut and the internally tapered member. Or, said tongues may be utilised, by being bent over, to provide a secondary locking effect in ensuring maintenance of locking by the internally tapered member. Preferably also the nut and the internally tapered member have hexagonal or other configurations of identical shape and dimensions for simultaneous engagement by a spanner or other manipulating tool.

A nut with locking means constructed according to a practical embodiment of the invention is illustrated in the accompanying drawing wherein:

Figure 1 is an elevation of the device shown in locked position and being used for clamping together two workpieces, Figure 2 is a plan view of Figure 1 and showing the internally tapered member in cross section, Figures 3 and 4 are an end elevation and section respectively of the internally tapered member, and Figures 5 and 6 are a longitudinal section and a face view respectively of the nut and sleeve member.

Referring to the drawing, a nut 10 of hexagonal or other configuration is formed on one side with integral laterally-extending portions 11 which conjointly form a sleeve split on two diameters which intersect one another at right angles. Or, the splits may be of a number providing a greater or lesser number of sleeve portions 11. A screw thread 12 formed through the body 10 of the nut is continued through the sleeve portions 11. The sleeve portions 11 are so formed that peripheral parts 13 thereof extending for a short distance from the body of the nut are parallel to the axis of the sleeve; beyond said parallel parts the sleeve portions are mutually tapered as indicated by the references 14.

For cooperation with the sleeve 11 there is provided an internally tapered collar 15, the internal taper 16 thereof substantially conforming to the taper of the peripheral parts 14 of the sleeve. The said collar 15 has a hexagonal or other configuration identical with that of the nut 10. Said collar 15 also is formed integrally with projecting tongues 17; said tongues are adapted to engage into recesses 18 formed in opposite flats of the nut 10. This ensures rotation of the collar and nut as a unit but permits of the collar having sliding movement with respect to the nut. The tongues 17 may be of such a length that when the nut is locked to the bolt as hereinafter described, end portions of the tongues project from the outer face of nut 10 as shown in Figure 1 for the purposes mentioned later.

To use the nut, the tongues 17 are engaged into the recesses 18, and the nut and its sleeve 11 are screwed on to a bolt shank or the like 19, the sleeve 11 preceding the nut 10, the nut 10 and collar 15 being rotated as a unit. A spanner used for screwing up the nut may also engage over the collar 15, but this is not essential. Eventually the collar 15 beds against a workpiece or the like 20. The nut 10 is now further screwed down, the result being that the tapered surfaces 14 of the sleeve sections 11 commence to slide down the tapered internal surface of the collar 15 due to relative sliding movement of nut 10 and collar 15. This effects inward displacement of the said sleeve sections, i. e. contraction of the sleeve on to the bolt shank 19, the sleeve thus gripping the bolt with an effort governed by the extent of tightening of the nut 10. Thus, firm locking of the nut on the bolt is obtained, and there results a complete unity of the internal and external threads without the imposition of any stretching of the threads of the bolt as with an ordinary lock nut. The end portions of the tongues 17 which now project beyond the nut 10, therefore constitute anvil portions which may be conveniently struck by a tool when it is desired to forcibly separate the members 11 in releasing the nut. Or, the end portions of the tongues 17 which now project beyond the nut 10, may be turned over inwards and this will hold the collar 15 in its set position relative to the nut 10 thereby providing a secondary locking effect in ensuring maintenance of the locking by the internally tapered collar 15.

If tongues 17 and receses 18 are not provided, or if provided, are not utilised to provide a secondary locking effect, the angle of taper of the coacting surfaces 14 and 16 may be such as to maintain the locking effect even if the collar 15 does not continue to bear against a workpiece 20 or other abutment. If secondary locking by the tongues 17 is provided for, then such locking is ensured. It is pointed out that the locking effect obtained on the bolt is such that the assembly comprising the parts 10 and 15 is prevented from rotating unintentionally in either direction.

When it is desired to release the nut, then, assuming the collar 15 has been bearing against a workpiece such as 20, the nut 10 (with collar 15) is screwed back along the bolt shank whilst still gripping same. When a sufficient space exists between collar 15 and the workpiece 20, the collar 15 is driven in a direction away from the nut 10, thereby to release the grip of the sleeve 11 on the bolt shank. If the tongues 17 are provided and project beyond the nut 10 as above explained, then after being bent back to their original position (assuming they have been bent down) they can be struck with a hammer to drive back the collar 15. As an additional or alternative facility for driving back the collar 15, opposite corners of the nut 10 may be cut off as indicated by reference 21, thereby to expose corner portions of the collar 15 to enable the latter to be driven back by striking a spanner placed with its jaws against the faces 21, and pressed on to the said exposed portions of the collar. In this connection it is pointed out that the width of the nut between the faces 21 is equal to the width across the ordinary flats of the nut, thereby enabling the same spanner as is used for turning the unit to be used for the above operation.

Another manner of providing for forcing back the collar 15 in the case when the nut and collar pass into a recess (in which the nut has to be manipulated by means of a box-spanner) consists in forming the collar 15 at its work-contacting end with an externally-projecting flange which can be struck by any suitable tool passed into the recess.

Although the device comprises two component parts, these are manipulated as a unit and said unit will be practically as easy to operate as an ordinary nut, the locking effect by the wedge action taking place automatically when tightening the nut. A feature is that, when the gripping action on the bolt shank produced by the wedge action exceeds a certain value, the resistance to further relative sliding movement of the nut sleeve and collar 15 will result in the collar tending to advance as a unit with the nut 10 towards the workpiece to increase the clamping pressure thereon, (the compound unit then momentarily functioning as an ordinary nut) until the clamping pressure resistance exceeds the wedge-action resistance, when a stronger grip on the bolt shank will obtain. Thus balance is obtained between clamping pressure and bolt grip, the latter increasing proportionately with the former. After final hard tightening, the compound unit cannot be moved in either direction along the bolt shank except by applying great force with a spanner.

The tongues 17 in addition to serving for the purposes aforesaid, provide visible indication as to the nut being in a locked condition.

The compound unit can be used in reverse manner (i. e. the nut 10 preceding the collar 15 and contacting the workpiece 20) by utilizing a spare ordinary nut which is screwed on to the bolt shank to follow up behind collar 15. Rotation of this spare nut relative to the main nut 10 will set up the locking effect by the wedge action, the protruding portions of tongues 17. (if provided) being then turned over to maintain the parts in locked position, and the compound unit being then screwed home.

It is pointed out that the construction illustrated and above described is put forward by way of example only, and that various modifications and additions may be made without departing from the scope of the invention. For instance, as already stated, it is not essential to provide means such as the tongues 17 and recesses 18 for compelling the collar 15 to rotate with the nut. As an alternative to providing the tongues 17 on the collar 15, there may be provided a washer adapted to fit on the bolt shank and to take up a position between the collar 15 and workpiece 20, said washer having a pair of tongues adapted to be bent down to bed into aligned notches formed in the peripheries of the collar 15 and nut 10, that is to say, notches similar to the notches 18 shown in the drawing. The nut 10, if so desired, may be in the form of a wing nut adapted to be tightened by hand. An alternative means of preventing relative rotation of the collar and nut consists in so forming the sleeve 11 that same has a polygonal or other non-circular cross section, the cavity 16 in the collar being shaped to correspond. A further modification consists in forming the sleeve 11 of uniform diameter or width throughout its length instead of same tapering as shown; in this case said sleeve may or may not be formed with a peripheral rib for contact with the tapering cavity 16 of collar 15. Further, the taper may be more acute or less acute than in the construction illustrated. For instance, if the members 11 and 15 are thin it may be necessary for the taper to have a steeper angle and in this case it may be necessary to utilise the tongues 17 to provide for secondary locking if the collar 15 is not to be maintained against a workpiece; that is to say, the invention is not limited to forming the taper at such an angle that the taper alone will maintain locking on the bolt if there is no abutment such as the workpiece 20.

Secure locking is ensured by the cumulative effect of the several elements which are provided for obtaining the wedge action. Greater force is necessary to draw the nut away from a workpiece than was required when screwing up, and it is pointed out that in order to release the nut, the compound unit may be forced back bodily and the grip by the wedge action must be subsequently broken. Prior to breaking down the wedge grip, the unit will remain equally tight on a bolt shank after forcing said unit away from a workpiece.

The device can be used repeatedly and will not damage the male thread since it only effects a contracting grip and does not impose lateral strain on the thread.

I claim:

1. A lock nut construction for bolts having a threaded shank, comprising, in combination, a nut element provided with opposite recesses and including a split sleeve forming a unitary part of said nut, said sleeve being internally threaded in continuation of the screw thread formed in the unsplit body of the nut and the said sleeve being also externally tapered, and an internally tapered collar adapted to slide on the external taper of said sleeve and contract the same so that said sleeve firmly binds on the bolt shank, the body of the nut and the internally tapered collar each having spanner engaging portions capable of simultaneous engagement by the same spanner, said collar being provided with tongues adapted to engage in said recesses of the nut element, and said tongues serving to interlock the collar and the nut for initial rotational movement on the shank of the bolt, and the outer ends of said tongues when projecting beyond the face of the nut being bendable over the latter to provide secondary locking means for maintaining the nut and sleeve together.

2. A locking nut construction for bolts having a threaded shank, comprising, a multi-faced nut element including a nut head and a split externally tapered sleeve having internal threads for engaging the threaded shank of the bolt, said nut head having recesses at opposite faces thereof, a collar having a tapered opening for receiving the tapered split sleeve, and tongues carried by the collar and adapted to fit into said recesses, said tongues being of sufficient length to project beyond the outer face of the nut head when the locking nut construction is applied to a workpiece and presenting anvil end portions when the locking nut construction is to be removed from the bolt whereby they may receive a hammer blow to separate the collar from the sleeve of the nut element, thereby, to facilitate removal thereof from the bolt shank.

FREDERICK WILLIAM BERRY.